(12) United States Patent
Mizuuchi (10) Patent No.: US 10,648,545 B2
(45) Date of Patent: May 12, 2020

(54) ELECTRIC LINEAR ACTUATOR (71) Applicant: NTN Corporation, Osaka-shi (JP)

(72) Inventor: Takao Mizuuchi, Iwata (JP)

(73) Assignee: NTN Corporation, Osaka-shi (JP)

( * ) Notice: Subject to any disclaimer, the term of this patent is extended or adjusted under 35 U.S.C. 154(b) by 58 days.

(21) Appl. No.: 14/578,350

(22) Filed: Dec. 20, 2014

(65) Prior Publication Data

US 2015/0101428 A1    Apr. 16, 2015

Related U.S. Application Data (63) Continuation of application No. PCT/JP2013/066271, filed on Jun. 12, 2013.

(30) Foreign Application Priority Data

Jun. 21, 2012   (JP) .................................. 2012-139827

(51) Int. Cl.
*F16H 57/029*    (2012.01)
*F16H 25/22*    (2006.01)
(Continued)

(52) U.S. Cl.
CPC ....... *F16H 25/2204* (2013.01); *F16H 57/029* (2013.01); *H02K 7/06* (2013.01);
(Continued)

(58) Field of Classification Search
CPC ............. F16J 15/14; F16J 15/40; F16J 15/062
(Continued)

(56) References Cited

U.S. PATENT DOCUMENTS

| 3,660,704 A | * | 5/1972 | Paine ...................... H01F 29/12 310/80 |
| 8,656,798 B2 | * | 2/2014 | Kawahara ............... F16H 25/20 74/89.32 |

(Continued)

FOREIGN PATENT DOCUMENTS

| DE | 2932506 A1 | * | 2/1981 | ............... F16J 10/04 |
| DE | 2932506 A1 | * | 2/1981 | ............... F16J 10/04 |

(Continued)

OTHER PUBLICATIONS

Derwent Record No. 2009-A58857; Title: Liquid gasket seal structure for use in motor vehicle, has hollow portion whose inner edge portion vacates space for locating connector portion of gasket rather than outer edge portion of inclination portion, when flanges are coupled; Published during Derwent-week 200903.*

(Continued)

*Primary Examiner* — Jake Cook
*Assistant Examiner* — Randell J Krug
(74) *Attorney, Agent, or Firm* — Harness, Dickey & Pierce, P.L.C.

(57) ABSTRACT

An electric linear actuator has a housing with an electric motor mounted on the housing. A speed reduction mechanism and ball screw mechanism converts rotational motion to axial linear motion. A nut is rotationally but axially immovably supported by bearings on the housing. A screw shaft is coaxially integrated with the drive shaft. The shaft is inserted into the nut, via helical grooves and a large number of balls. The screw shaft is non-rotationally supported on the housing but is axially movable. The housing has a first housing and a second housing arranged with their end faces abutting against each other. Joining surfaces of the end faces of the first and second housings are sealed by a curing liquid curable material.

6 Claims, 5 Drawing Sheets

(51) Int. Cl.
*H02K 7/06* (2006.01)
*F16H 15/14* (2006.01)
*F16H 15/40* (2006.01)
*F16H 25/20* (2006.01)
*C09K 3/10* (2006.01)

(52) U.S. Cl.
CPC ............... *C09K 2003/1059* (2013.01); *C09K 2200/0685* (2013.01); *F16H 15/14* (2013.01); *F16H 15/40* (2013.01); *F16H 2025/2031* (2013.01); *F16H 2025/2062* (2013.01); *F16H 2025/2081* (2013.01); *Y10T 74/18576* (2015.01)

(58) Field of Classification Search
USPC ............ 74/89.33, 89.23, 89.34; 277/529, 407
See application file for complete search history.

(56) References Cited

U.S. PATENT DOCUMENTS

| | | | | |
|---|---|---|---|---|
| 2005/0253343 A1* | 11/2005 | Hampton | ............... | F16J 15/062 277/628 |
| 2011/0049814 A1* | 3/2011 | Iwase | ....................... | F16J 15/14 277/628 |
| 2012/0247240 A1* | 10/2012 | Kawahara | ............... | F16H 25/20 74/89.23 |
| 2014/0157918 A1* | 6/2014 | Ikeda | ................. | F16H 25/2204 74/89.23 |

FOREIGN PATENT DOCUMENTS

| | | | |
|---|---|---|---|
| DE | 195 17 735 A1 | | 11/1996 |
| FR | 1404116 | | 6/1965 |
| JP | S60-40868 | | 3/1985 |
| JP | 2008-228557 | | 9/2008 |
| JP | 2008303993 A | * | 12/2008 |
| JP | 2008303993 A | * | 12/2008 |
| JP | 2010-068559 | | 3/2010 |
| JP | 2010068559 A | * | 3/2010 |

OTHER PUBLICATIONS

Translation of JP 2008-303993 obtained Nov. 12, 2015.*
English translation of JP 2008303993, Sugimoto (Year: 2008).*

* cited by examiner

PRIOR ART

[Fig 7]

PRIOR ART

ELECTRIC LINEAR ACTUATOR

CROSS-REFERENCE TO RELATED APPLICATIONS

This application is a continuation of International Application No. PCT/JP2013/066271, filed Jun. 12, 2013, which claims priority to Japanese Application No. 2012-139827, filed Jun. 21, 2012. The disclosures of the above applications are incorporating herein by reference.

FIELD

The present disclosure relates to an electric actuator provided with a ball screw mechanism used in motors for general industries and driving sections of automobiles etc. and, more particularly, to an electric actuator used in a transmission or a parking brake to convert rotary motion from an electric motor to linear motion of a driving shaft, via a ball screw mechanism.

BACKGROUND

Generally gear mechanisms, such as a trapezoidal thread worm gear mechanisms or a rack and pinion gear mechanisms, are used as the mechanism to convert rotary motion of an electric motor to an axial linear motion in an electric linear actuator. These actuators are used in various types of driving sections. These motion converting mechanisms involve sliding contact portions. Thus, power loss is increased. Accordingly, this necessitates an increase in the size of the electric motors and in power consumption. Accordingly, ball screw mechanisms have been widely adopted as more efficient actuators.

Figure 6:
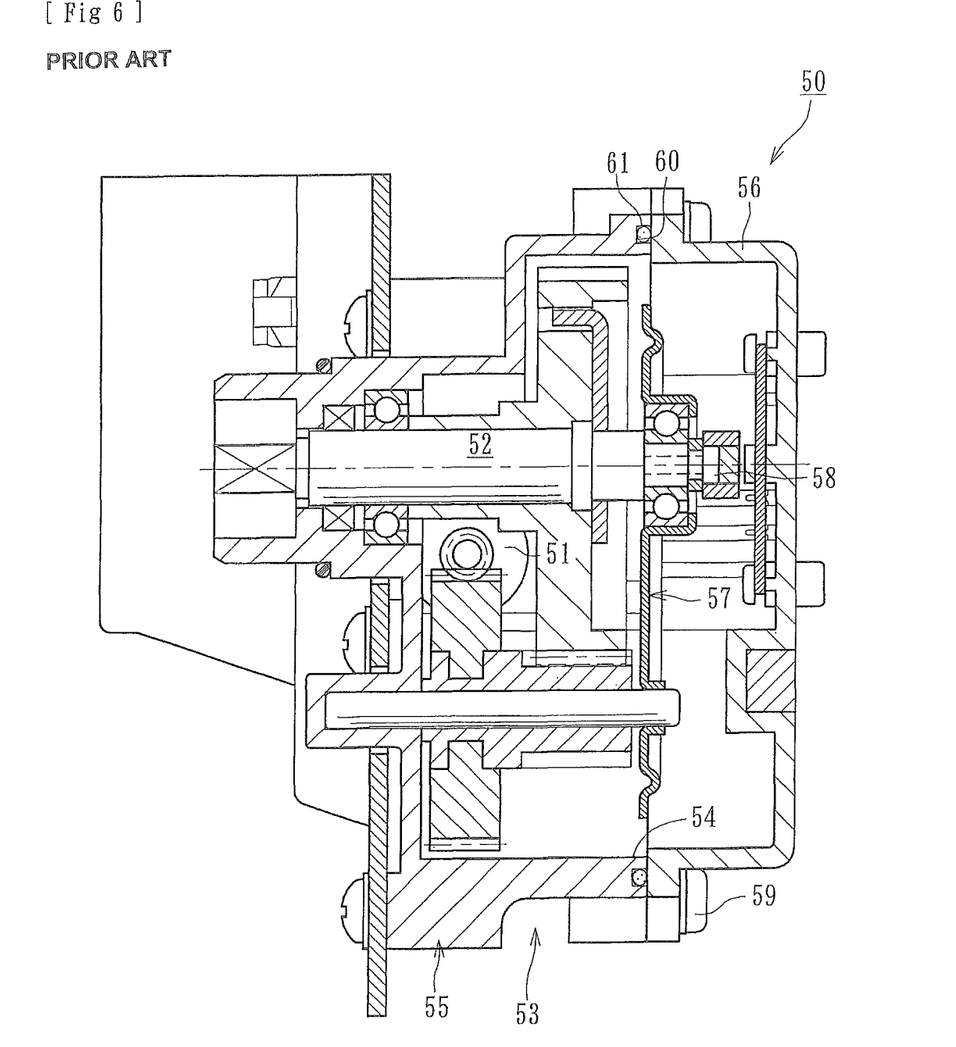
FIG. 6 is a longitudinal section view of a prior art electric linear actuator.

A prior art electric linear actuator is shown in FIG. 6. This electric linear actuator 50 includes an electric motor 51, a speed reduction mechanism 53, a gear casing 55, an end cover 56 and an intermediate cover 57. The speed reduction mechanism 53 reduces the rotational speed of the electric motor 51 and transmits it to an output shaft 52. The gear casing 55 contains the speed reduction mechanism 53. The gear casing 55 includes an opening 54 at one end side of the output shaft 52. The end cover 56 closes the opening 54 of the gear casing 55. The intermediate cover 57 is positioned between the gear casing 55 and the end cover 56 to bear one end of the output shaft 52. The speed reduction mechanism 53 is arranged on the gear casing 55 side with respect to the intermediate cover 57. A rotational position detecting device 58 is arranged on the end cover 56 side with respect to the intermediate cover 57.

Figure 7:
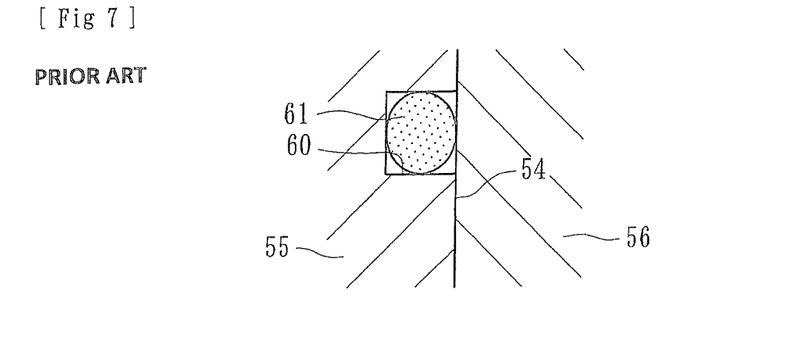
FIG. 7 is a partially enlarged sectional view of a sealing structure of FIG. 6.

The end cover 56 is fastened to the opening 54 of the gear casing 55. The entire periphery of the opening 54 of the gear casing 55 is formed with a groove 60. A packing 61 is arranged in the groove 60. The packing 61 prevents entry of dust or foreign matters into the inside of the speed reduction mechanism 53 through the junction between the gear casing 55 and the end cover 56. See, JP 2010-68559 A.

However, in the prior art sealing structures, the gear casing 55 and cover 56 are liable to be deformed since they are formed from material of low rigidity such as aluminum alloy. Thus, a gap or clearance caused by the deformation of the gear casing 55 or cover 56 cannot be sealed only by elastic deformation of the packing 61. Thus, the sealability of the speed reduction mechanism 53 cannot be assured.

In order to keep sealability of the electric linear actuator, liquid gasket with adhesiveness and viscosity is applied. Thus, it is an object of the present disclosure to provide an electric linear actuator with sealability between the joining surfaces of the housings.

SUMMARY

To achieve the object of the present disclosure, an electric linear actuator comprises a housing with an electric motor mounted on the housing. A speed reduction mechanism transmits the rotational power of the electric motor to a ball screw mechanism, via a motor shaft while reducing the motor speed. The ball screw mechanism is adapted to convert the rotational motion of the electric motor transmitted, via the speed reduction mechanism, to an axial linear motion of a drive shaft. The drive shaft includes a nut with a helical screw groove on its inner circumference. The nuts is rotationally movable but is axially immovably supported by bearings on the housing. A screw shaft is coaxially integrated with the drive shaft. The screw shaft is formed with a helical screw groove on its outer circumference corresponding to the helical screw groove of the nut. The screw shaft is inserted into the nut, via a large number of balls. The screw shaft is non-rotationally supported on the housing but is axially movable. The housing includes a first housing and a second housing with their end faces abutting against each other. The joining surfaces of the end faces of the first and second housings are sealed by a curing liquid curable material.

The electric linear actuator of the present disclosure has a speed reduction mechanism to transmit the rotational power of the electric motor to a ball screw mechanism, via a motor shaft while reducing the motor speed. The ball screw mechanism converts the rotational motion of the electric motor transmitted, via the speed reduction mechanism, to an axial linear motion of a drive shaft. The drive shaft includes a nut formed with a helical screw groove on its inner circumference. The nut is rotationally, but axially immovably, supported by bearings on the housing. A screw shaft is coaxially integrated with the driving shaft. The screw shaft is formed with a helical screw groove on its outer circumference corresponding to helical screw groove of the nut. The screw shaft is inserted into the nut, via a large number of balls. The screw shaft is non-rotationally supported on the housing but moves axially. The housing has a first housing and a second housing with their end faces abutting against each other. Joining surfaces of the end faces of the first and second housings are sealed by a curing liquid curable material. Thus, it is possible to provide an electric linear actuator that can surely achieve close-contact of the first and second housings to each other according to flexible deformation of the curable material due to its adhesiveness and viscosity. Thus, this achieves sealability between the joining surfaces of the housings even if the housings undergo a relatively large deformation.

The curable material is a silicone-based liquid gasket. It achieves sealability within about 24 hours since the silicone-based liquid gasket can be cured in a relatively short time.

The joining surfaces of the first and second housings are formed with a first void and a second void arranged opposite to and communicating with one another. The curable material is injected into the first void. A volume of the curable material is larger than that of the first void and smaller than the total volume of the first and second voids. This enables excessive curable material that overflows from the first void to flow into the second void. Thus, this prevents the overflowed curable material from protruding to the outside of the second void. Accordingly, it is possible to prevent protruding excessive curable material from falling off from the housing or it prevents the protruding excessive curable material from spoiling the appearance of the housing.

The first void is formed with a substantially semicircular cross-section. The second void is formed with a substantially tri-angular cross-section. This makes it possible to effectively prevent the falling off of protruding curable material by a simple and space-saving structure.

The electric linear actuator of the present disclosure comprises a housing with an electric motor mounted on the housing. A speed reduction mechanism transmits the rotational power of the electric motor to a ball screw mechanism, via a motor shaft, while reducing the motor speed. The ball screw mechanism converts the rotational motion of the electric motor transmitted, via the speed reduction mechanism, to an axial linear motion of a drive shaft. The drive shaft includes a nut formed with a helical screw groove on its inner circumference. The nut is rotationally, but axially immovably, supported by bearings on the housing. A screw shaft is coaxially integrated with the drive shaft. The screw shaft is formed with a helical screw groove on its outer circumference corresponding to helical screw groove of the nut. The screw shaft is inserted into the nut, via a large number of balls. The screw shaft is non-rotationally supported on the housing but moves axially. The housing has a first housing and a second housing arranged with their end faces abutting against each other. Joining surfaces of the end faces of the first and second housings are sealed by a curing liquid curable material. Thus, it is possible to provide an electric linear actuator that can surely achieve close-contact of the first and second housings with each other according to the flexible deformation of the curable material due to its adhesiveness and viscosity. Thus, sealability is achieved between the joining surfaces of the housings even if the housings undergo a relatively large deformation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

An electric linear actuator includes a housing formed from aluminum alloy. An electric motor is mounted on the housing. A speed reduction mechanism transmits the rotational power of the electric motor to a ball screw mechanism, via a motor shaft, while reducing the motor speed. The ball screw mechanism converts the rotational motion of the electric motor, transmitted via the speed reduction mechanism, to an axial linear motion of a drive shaft. The drive shaft includes a nut and screw shaft. The nut is formed with a helical screw groove on its inner circumference. The nut is rotationally, but axially immovably, supported by bearings on the housing. The screw shaft is coaxially integrated with the drive shaft. The screw shaft is formed with helical screw groove on its outer circumference corresponding to helical screw groove of the nut. The screw shaft is inserted into the nut, via a large number of balls. The screw shaft is non-rotationally supported on the housing but moves axially. The housing has a first housing and a second housing arranged with their end faces abutting against each other. Joining surfaces of the first and second housings are formed with a first void and a second void. The first and second voids are arranged opposite to one another and communicate with one another. The curable material is injected into the first void. The volume of the curable material is larger than the volume of the first void and smaller than the total volume of the first and second voids.

One preferable embodiment of the present disclosure will be described with reference to the drawings.

Figure 1:
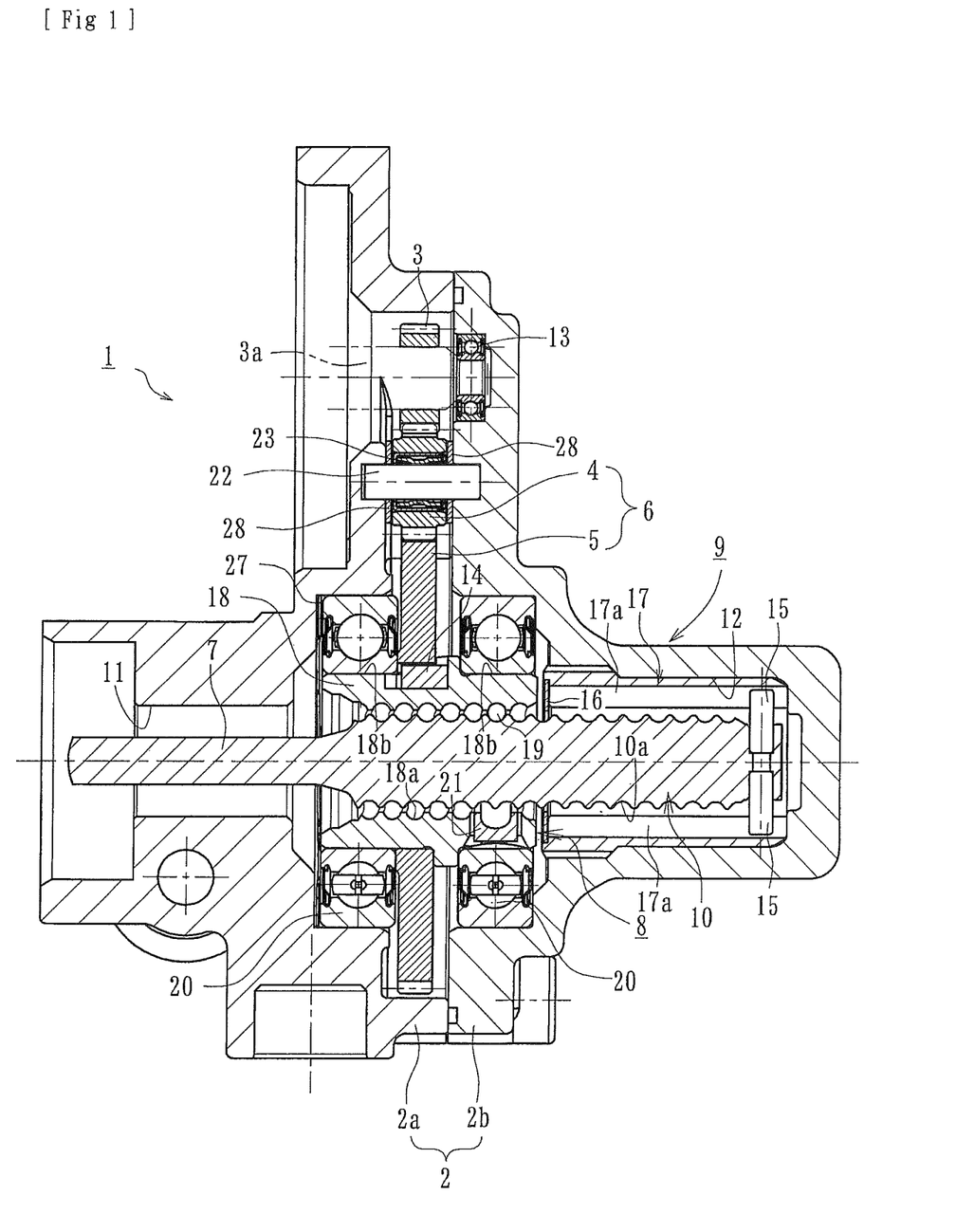
FIG. 1 is a longitudinal section view of one preferable embodiment of the electric linear actuator.
Figure 2:
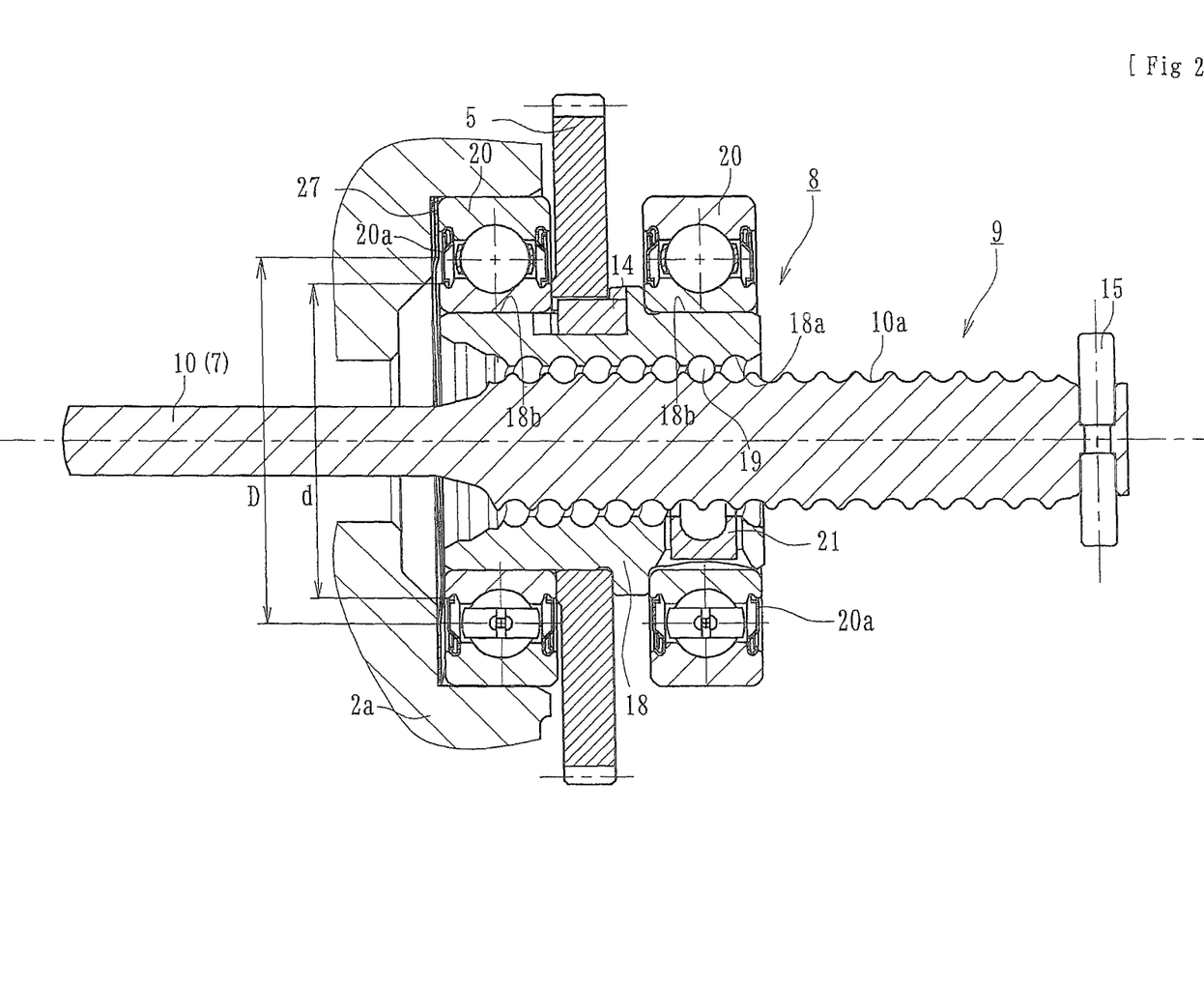
FIG. 2 is a longitudinal section view of an actuator main body of the electric linear actuator of FIG. 1.
Figure 3:
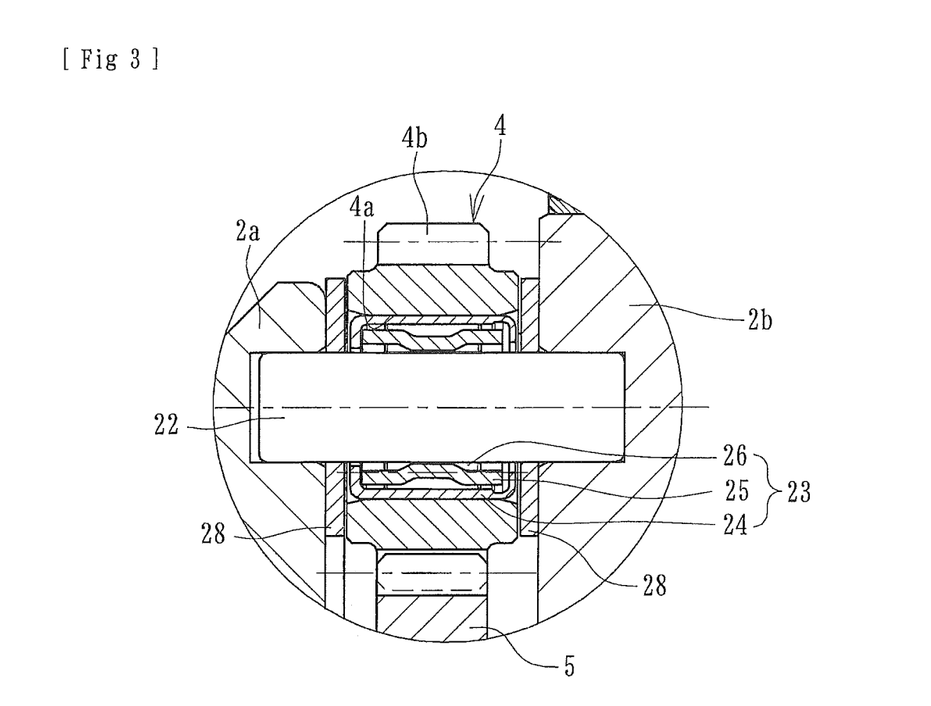
FIG. 3 is a partially enlarged sectional view of an intermediate gear of the electric linear actuator of FIG. 1.
Figure 4:
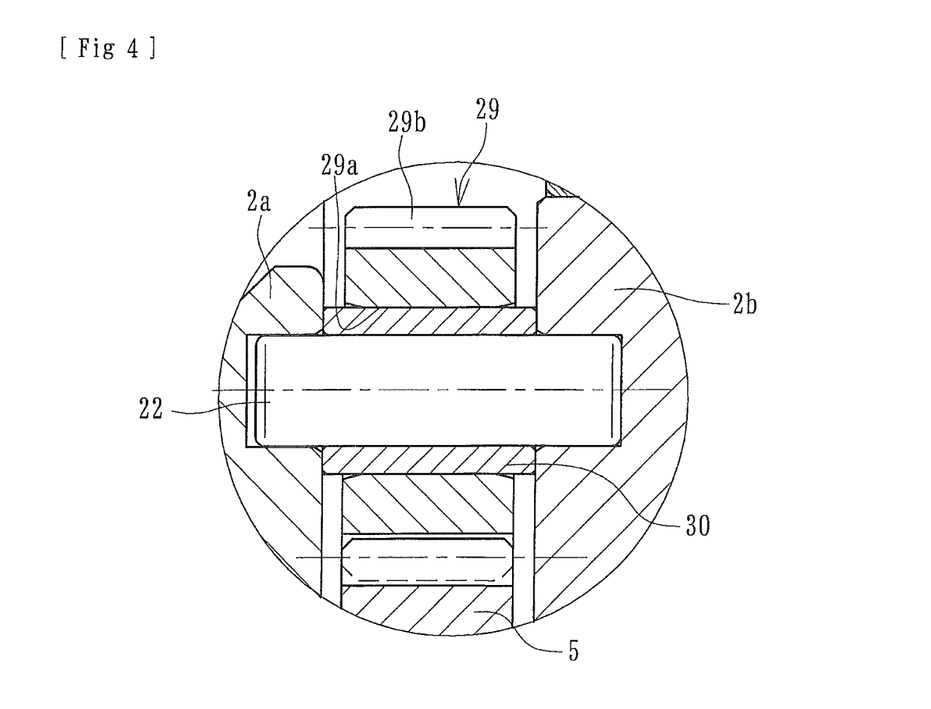
FIG. 4 is a partially enlarged sectional view of a modification of the intermediate gear of FIG. 3.
Figure 5:
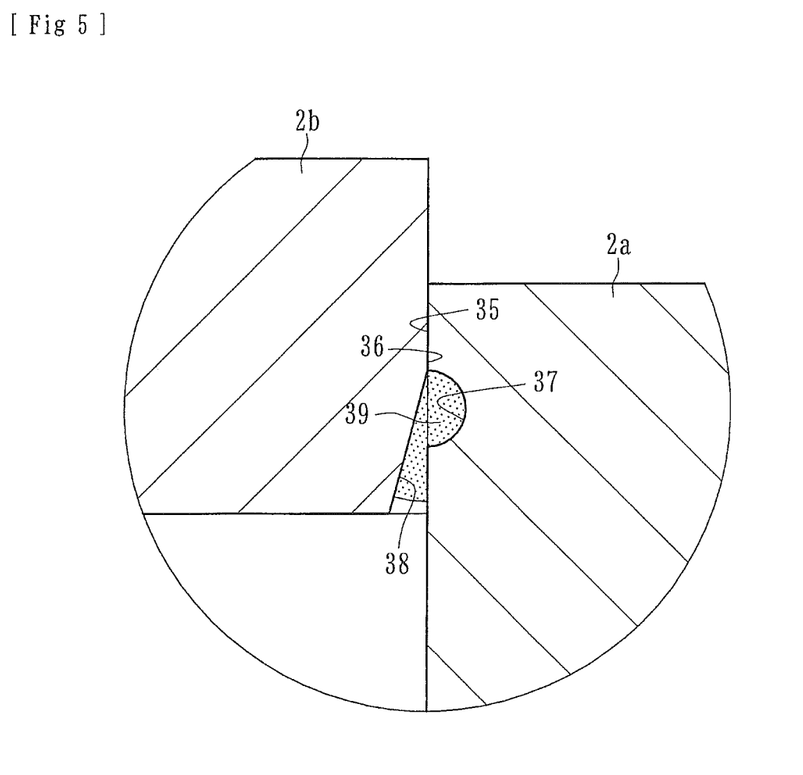
FIG. 5 is a partially enlarged section view of a joining portion between first and second housing of the electric linear actuator of FIG. 1.

FIG. 1 is a longitudinal section view of one preferable embodiment of the electric linear actuator. FIG. 2 is a longitudinal section view of an actuator main body of the electric linear actuator of FIG. 1. FIG. 3 is a partially enlarged sectional view of an intermediate gear of the electric linear actuator of FIG. 1. FIG. 4 is a partially enlarged sectional view of a modification of the intermediate gear of FIG. 3. FIG. 5 is a partially enlarged section view of a joining portion between the first and second housings of the electric linear actuator of FIG. 1.

As shown in FIG. 1, an electric linear actuator 1 includes a cylindrical housing 2, an electric motor (not shown) mounted on the housing 2, an intermediate gear 4, a speed reduction mechanism 6, a ball screw mechanism 8 and an actuator main body 9. The intermediate gear 4 mates with an input gear 3 mounted on a motor shaft 3a of the electric motor. The speed reduction mechanism 6 includes an output gear 5 that mates with the intermediate gear 4. The ball screw mechanism 8 converts rotational motion of the electric motor to axial linear motion of a drive shaft 7, via the reduction mechanism 6. The actuator main body 9 includes the ball screw mechanism 8.

The housing 2 is formed of aluminum alloy such as A 6063 TE or A DC 12 by aluminum die casting. The housing 2 has a first housing 2a and a second housing 2b. The first and second housings 2a, 2b abut one another and are integrally secured into each other by fastening bolts (not shown). The electric motor is mounted on the first housing 2a. Accommodating bores 11, 12, to accommodate the screw shaft 10, are formed respectively on the first and second housings 2a, 2b.

The input gear 3 is press-fit onto the end of the motor shaft 3a. The input gear 3 is non-rotational relative to the motor shaft 3a. The motor shaft 3a is rotationally supported by a rolling bearing 13, such as a deep groove ball bearing. The output gear 5 mates with the intermediate spur gear 4. The output gear 5 is rigidly secured on a nut 18 that forms the ball screw mechanism 8, which is later mentioned.

The drive shaft 7 is integrated with the screw shaft 10 to form the ball screw mechanism 8. Engaging pins 15, 15 are arranged at one end (right end in FIG. 1) of the drive shaft 7. These guide pins 15, 15 can abut against a stopper ring 16 mounted on the second housing 2b to surely prevent the drive shaft 7 from falling out of the housing 2 and from being locked while abutting against the inner wall of the housing 2. A numeral 17 denotes a sleeve mounted in the accommodating bore 12 of the housing 2b. The sleeve 17 is formed with axially extending grooves 17a, 17a. The engaging pins 15, 15 engage the grooves 17a, 17a so that the screw shaft 10 is held against rotation but is axially slidable.

As shown in an enlarged view of FIG. 2, the ball screw mechanism 8 includes the screw shaft 10 and the nut 18 fit on the screw shaft 10 via balls 19. The screw shaft 10 is formed with a helical screw groove 10a on its outer circumference. The nut 18 is formed, on its inner circumference, with a helical screw groove 18a corresponding to the helical screw groove 10a of the screw shaft 10. The number of balls 19 is rollably contained between these two screw grooves 10a, 18a. The nut 18 is rotationally supported on the first and second housings 2a, 2b by two bearings 20, 20. The nut is axially immovable relative to the housings 2a, 2b. A numeral 21 denotes a bridge member that connects ends of the screw groove 18a and infinitely circulates balls 19 through the screw groove 18a of the nut 18.

The cross-sectional configuration of each screw groove 10a, 18a may be either one of a circular-arc or Gothic-arc configuration. However, this embodiment adopts the Gothic-arc configuration. Thus, it can have a large contacting angle with the ball 19 and a small axial gap. This provides large rigidity against the axial load and suppresses the generation of vibration.

The nut 18 is formed from case hardened steel such as SCM415 or SCM420. Its surface is hardened to HRC 55~62 by vacuum carburizing hardening. This enables the omission of treatments such as buffing for scale removal after heat treatment. Thus, this reduces the manufacturing cost. The screw shaft 10 is formed of medium carbon steel such as S55C or case hardened steel such as SCM415 or SCM420. Its surface is hardened to HRC 55~62 by induction hardening or carburizing hardening.

The output gear 5, forming the reduction mechanism 6, is integrally secured on the outer circumference 18b of the nut 18. The two supporting bearings 20, 20 are press-fit onto either side of the output gear 5, via a predetermined interface. This prevents the generation of axial positional displacement between the supporting bearings 20, 20 and the output gear 5 even though a thrust load would be applied to them from the drive shaft 7. In addition, each of the supporting bearings 20, 20 is formed as a deep groove ball bearing of the sealed type. Shield plates 20a, 20a are arranged on either side of the support bearing. This shield plates 20a, 20a prevent leakage of grease contained in the bearings and the penetration of worn powder or debris into the bearings from the outside.

The supporting bearings 20, 20 rotationally supporting the nut 18 are formed as deep groove ball bearings with the same specifications. Thus, both a thrust load from the drive shaft 7 and a radial load, applied via the output gear 5, can be borne by these bearings 20, 20. Additionally, it is possible to simplify the confirming operation to prevent erroneous assembly. This improves the assembling workability. Here, the term "same specification" means that not only the inner diameter, outer diameter and width of the bearings, but size and number of the balls and internal clearance of the bearing are same.

One of the supporting bearings 20, 20 is mounted on the first housing 2a via a washer 27. The washer 27 is formed as a ring-shaped elastic member. The washer 27 is a wave washer press-formed of austenitic stainless steel sheet (e.g. SUS304 of JIS) or preservative cold rolled steel sheet (e.g. SPCC of JIS). Its inner diameter "D" is larger than an outer diameter "d" of an inner ring of the supporting bearing 20. This eliminates axial play of the paired bearings 20, 20. Thus, this obtains smooth rotational performance. In addition, the washer 27 abuts only with the outer ring of the bearing 20 and does not interfere with the inner ring forming a rotation ring. Thus, it is possible to surely prevent an increase of friction due to contact of the inner ring with the first housing 2a. Thus, locking of the nut 18 is prevented even if the nut 18 would be urged against the housing 2a by generated anti-thrust load.

As shown in FIG. 3, the intermediate gear 4 is rotationally supported via a rolling bearing 23 on a gear shaft 22. The gear shaft 22 is supported at its opposite ends on the first and second housings 2a, 2b. A misalignment (assembling error) of the gear shaft 22 and the rolling bearing 23 can be allowed. Thus, smooth rotation of the intermediate gear 4 will be ensured. This is accomplished by the end of the gear shaft 22 of second housing side being set, via clearance fitting and the end of the gear shaft 22 of first housing side being set, via press-fitting. In the embodiment illustrated in FIG. 3, the rolling bearing 23 is formed as a needle roller bearing. It is a so-called shell type with an outer ring 24 press-formed of steel sheet and press-fit into an inner circumference of the intermediate gear 4. A plurality of needle rollers 26 is rollably contained in the outer ring 24, via a cage 25. This enables the adoption of easily available standard design bearings. Thus, this reduces the manufacturing cost of the electric linear actuator.

Ring-shaped washers 28, 28 are arranged at either side of the intermediate gear 4. This prevents the intermediate gear 4 from directly contacting with the first and second housings 2a, 2b. A face width of gear teeth 4b of the intermediate gear 4 is formed smaller than the entire axial width of the intermediate gear 4. This makes it possible to reduce contacting area between the intermediate gear 4 and the washers 28, 28. Thus, this achieves smooth rotational performance while suppressing frictional resistance during rotation. The washers 28, 28 are flat washers press-formed of austenitic stainless steel sheet or preservative cold rolled steel sheet. Alternatively, the washers 28, 28 may be formed from brass, sintered metal or thermoplastic synthetic resin such as PA (polyamide) 66 etc. A predetermined amount of fiber reinforcing materials such as GF (glass fibers) etc. may be impregnated in the resin.

An axial width of the rolling bearing 23 of the intermediate gear 4 is set smaller than the entire axial width of the intermediate gear 4. This prevents the side surfaces of the bearing 23 from being worn and deformed. Thus, this obtains smooth rotational performance.

A modification of FIG. 3 is shown in FIG. 4. An intermediate gear 29 is rotationally supported via a sliding bearing 30 on the gear shaft 22. The gear shaft 22 is supported at its opposite ends on the first and second housings 2a, 2b. According to this modification, a face width 29b of gear teeth of the intermediate gear 29 are formed the same as the entire axial width of the intermediate gear 29. The sliding bearing 30 is structured as an oil impregnated bearing (e.g. "BEARFIGHT" (registered trade mark of NTN corp., Japan)). The bearing 30 is press-fit into the inner circumference 29a of the intermediate gear 29. An entire axial width of the sliding bearing 30 is formed larger than the entire axial width of the intermediate gear 29. This prevents the intermediate gear 29 from contacting the first and second housings 2a, 2b. Thus, the gear has wear prevention characteristics without mounting any washers. This achieves smooth rotational performance while suppressing frictional resistance during rotation of the intermediate gear 29. Also, this reduces the manufacturing cost while suppressing the increase of the number of components. The sliding bearing 30 may be formed of thermoplastic polyimide resin by injection molding.

The sleeve 17 is a cylindrical member formed of medium carbon steel such as S55C or case-hardened steel such as SCM415 or SCM420 by a cold rolling method. It is formed with axially extending grooves 17a, 17a arranged at opposite positions on the inner circumference of the sleeve 17. The surfaces of the grooves 17a are metallic plated by electroless plating. The engaging pins 15 are also metallic plated by hard chromium plating. This improves the wear resisting property. Thus, it suppresses wear of the grooves 17a and pins 15 for a long term. Other metallic plating methods may be used such as galvanizing, uni-chromium plating, chromate plating, nickel plating, chromium plating, Kanigen plating etc. It is preferable to use different kinds of metallic platings on the grooves 17a and the engaging pins 15 to prevent sticking of the grooves 17a and pins 15.

As shown in FIG. 5, joining surfaces of the first housing 2a and the second housing 2b are illustrated. The first housing 2a includes a first void 37. The second housing 2b includes a second void 38. The voids 37, 38 are oppositely arranged to each other. Curable material 39 is injected into the first void 37. A volume of the curable material 39 is larger than the volume of the first void 37 and smaller than the total volume of the first and second voids 37, 38. That is, excessive curable material 39 overflows from the first void 37 into the oppositely arranged second void 38. This prevents the overflowed curable material from protruding outside of the second void 38. Accordingly, it is possible to prevent protruded excessive curable material from falling off from the housing 2 or from spoiling the appearance of the housing 2. In addition, the joining surfaces 35, 36 of the end faces of the first and second housings 2a, 2b are sealed by curing liquid curable material 39. Thus, it is possible to provide an electric linear actuator that can surely achieve close-contact of the first and second housings 2a, 2b. The flexible deformation of the curable material 39, due to adhesiveness and viscosity, overcomes the discontinuities between the housings during deformation. Thus, this achieves sealability between the joining surfaces 35, 36 of the housings even if the housings 2a, 2b undergo a relatively large deformation.

Examples of the curable materials 39 are silicone based or synthetic rubber based liquid gaskets such as organic solvent silicone-based liquid gasket, water soluble silicone-based liquid gasket. Resin based liquid gaskets such as anaerobic acrylic based liquid gasket, synthetic resin emulsion type liquid gasket and resin based liquid gasket of high molecular resin, fluorine plastic and inorganic resin. The curable material 39 with a resin based liquid gaskets can be cured in a relatively short time. Thus, it is possible to achieve sealability within about 24 hours.

According to the present disclosure, the first void 37 is formed with a substantially semicircular cross-section. The second void 38 is formed with a substantially tri-angular cross-section. This makes it possible to effectively prevent falling off of protruded curable material by a simple and space-saving structure.

The electric linear actuator of the present disclosure can be used in an electric motor for general industry and driving sections of an automobile etc. It can be applied to an electric linear actuator with a ball screw mechanism to convert the rotational input from an electric motor to the linear motion of a drive shaft.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. An electric linear actuator comprising:
   a housing;
   an electric motor mounted on the housing;
   a speed reduction mechanism to transmit the rotational power of the electric motor to a ball screw mechanism, via a motor shaft, while reducing the motor speed;
   the ball screw mechanism converts the rotational motion of the electric motor, transmitted via the speed reduction mechanism, to an axial linear motion of a drive shaft, a nut includes a helical screw groove on its inner circumference, the nut is rotationally, but axially immovably, supported by bearings on the housing, a screw shaft is coaxially integrated with the drive shaft, the screw shaft includes a helical screw groove on its outer circumference corresponding to the helical screw groove of the nut, the screw shaft is inserted into the nut, via a number of balls, the screw shaft is non-rotationally supported on the housing but is axially movable;
   the housing comprises a first housing and a second housing arranged with their end faces abutting against one another, the first and second housings formed from an aluminum alloy; and
   joining surfaces of the end faces of the first and second housings include a portion where the first housing and the second housing are in direct contact and a portion where a curable material intervenes between the first housing and the second housing, the curable material used to achieve sealing;
   the joining surfaces of the first and second housings are formed with a first void and a second void, the first void is formed with a substantially semicircular cross-section and the second void is formed with a substantially tri-angular cross-section, a groove formed by the first void is formed on the entire circumference of the housing, the voids are arranged opposite to and communicating with one another across the entire width of at least the first void, a smallest vertex of the substantially triangular cross-section second void is arranged on the diameter of the substantially semicircular cross-section first void and the first void is entirely filled with the liquid curable material and a volume of the curable material is larger than the first void and smaller than a total volume of the first and second voids preventing excess curable material from protruding outside of the second void;
   by curing the liquid curable material, sealability between the joining surfaces of the first and second housing are maintained due to viscosity of the curable material even during deformation of the housing;
   flexible deformation of the curable material, due to adhesiveness and viscosity, overcomes the discontinuities between the first and second housings during deformation to achieve sealability between the joining surfaces of the end faces of the first and second housings.

2. The electric linear actuator of claim 1, wherein the curable material is a silicone-based liquid gasket.

3. The electric linear actuator of claim 1, wherein the curable material is injected into the first void.

4. An electric linear actuator comprising:
a housing;
an electric motor mounted on the housing;
a speed reduction mechanism to transmit the rotational power of the electric motor to a ball screw mechanism, via a motor shaft, while reducing the motor speed;
the ball screw mechanism converts the rotational motion of the electric motor, transmitted via the speed reduction mechanism, to an axial linear motion of a drive shaft, a nut includes a helical screw groove on its inner circumference, the nut is rotationally, but axially immovably, supported by bearings on the housing, a screw shaft is coaxially integrated with the drive shaft, the screw shaft includes a helical screw groove on its outer circumference corresponding to the helical screw groove of the nut, the screw shaft is inserted into the nut, via a number of balls, the screw shaft is non-rotationally supported on the housing but is axially movable;
the housing comprises a first housing and a second housing arranged with their end faces abutting against one another, the first and second housings formed from an aluminum alloy; and
joining surfaces of the end faces of the first and second housings include a portion where the first housing and the second housing are in direct contact and a portion where a curable material intervenes between the first housing and the second housing, the curable material used to achieve sealing,
the joining surfaces of the first and second housings are formed with a first void and a second void, the first void is formed with a substantially semicircular cross-section and the second void is formed with a substantially tri-angular cross-section, a groove formed by the first void is formed on the entire circumference of the housing, the voids are arranged opposite to and communicating with one another across the entire width of at least the first void;
the voids are continuous about the joining surfaces forming a closed configuration when the first and second housings abut one another the voids oppose one another so that the voids are continuous enabling flow of the curable material between the voids to achieve sealability between the joining surfaces of the end faces of the first and second housings and the first void is entirely filled with the liquid curable material and a volume of the curable material is larger than the first void and smaller than a total volume of the first and second voids preventing excess curable material from protruding outside of the second void.

5. The electric linear actuator of claim 4, wherein the curable material is a silicone-based liquid gasket.

6. The electric linear actuator of claim 4, wherein the curable material is injected into the first void.

* * * * *